United States Patent
Laos

(10) Patent No.: US 6,558,041 B2
(45) Date of Patent: May 6, 2003

(54) DAMPER ASSEMBLY FOR A ROTATING SHAFT AND METHODS FOR DAMPENING SHAFT VIBRATIONS

(75) Inventor: Hector Emilio Laos, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 09/748,123

(22) Filed: Dec. 27, 2000

(65) Prior Publication Data

US 2003/0038006 A1 Feb. 27, 2003

(51) Int. Cl.[7] .............................................. F16C 27/00
(52) U.S. Cl. .................... 384/99; 384/477; 384/581; 277/355; 277/916
(58) Field of Search .................... 384/477, 99, 535, 384/581; 277/355, 916

(56) References Cited

U.S. PATENT DOCUMENTS

| | | | | |
|---|---|---|---|---|
| 3,844,630 A | * | 10/1974 | Lechner | 308/184 |
| 4,337,983 A | * | 7/1982 | Hibner | 308/26 |
| 4,541,741 A | * | 9/1985 | Woodbridge et al. | 384/482 |
| 4,733,977 A | * | 3/1988 | Eisenmann et al. | 384/477 |
| 4,867,655 A | * | 9/1989 | Barbic et al. | 384/535 |
| 5,026,252 A | * | 6/1991 | Hoffelner | 277/355 |
| 5,205,384 A | * | 4/1993 | Heshmat | 188/264 B |
| 5,316,391 A | * | 5/1994 | Monzel | 384/99 |
| 5,344,239 A | * | 9/1994 | Stallone et al. | 384/99 |
| 5,794,942 A | * | 8/1998 | Vance et al. | 277/303 |
| RE36,270 E | * | 8/1999 | Duggan | 384/99 |
| 5,997,004 A | * | 12/1999 | Braun et al. | 277/352 |
| 6,135,639 A | | 10/2000 | Dede | |
| 6,293,554 B1 | * | 9/2001 | Dinc et al. | 277/355 |

FOREIGN PATENT DOCUMENTS

DE 197 50 205 * 5/1999

OTHER PUBLICATIONS

"Hybrid Brush Pocket Damper Seals for Turbomachinery," Laos et al.

* cited by examiner

Primary Examiner—Jack Lavinder
Assistant Examiner—Bradley King
(74) Attorney, Agent, or Firm—Nixon & Vanderhye

(57) ABSTRACT

The damper assembly includes a centering spring about a bearing for a rotating shaft. The centering spring is fixed to and spaced from a fixed component. One or more annular arrays of brush bristles project from the fixed component and have tips in engagement with the non-rotating, radially and orbitally movable centering spring. With the brush bristles engaging the centering spring, the vibrations and dynamic loadings of the shaft on the bearing and centering spring are damped.

8 Claims, 2 Drawing Sheets

DAMPER ASSEMBLY FOR A ROTATING SHAFT AND METHODS FOR DAMPENING SHAFT VIBRATIONS

BACKGROUND OF THE INVENTION

The present invention relates to a damper assembly for damping the amplitude of vibrations of a rotating shaft and particularly relates to a damper assembly employing brush bristles to provide the damping action.

Dampers for supporting the bearings on a rotating shaft are also well known. For example, squeeze film bearing dampers are often used. Fundamentally a squeeze film damper comprises a centering spring that holds either a ball bearing or a tilting pad bearing about the rotating shaft. An oil film under pressure is disposed between the centering spring and a fixed support. The damping action is generated by the orbital motion of the outer race or centering spring which squeezes the oil film. In an alternative squeeze-type damper design, another way of generating the damping action is to use an annular solid damping insert, for example, an insert formed of metal mesh, between the fixed support and the damper centering spring.

It is also well known that rotating shafts in turbines and generators are prone to vibrations and dynamic loads caused by rotor or shaft imbalances. Most types of bearings in such systems, however, provide very little damping to the system. In applications of this type, it is necessary to have a moderate amount of damping in the system to traverse the critical speeds with low amplitude of motion and to maintain the rotor system stable. That is, in a system which has negligible damping, such as a system employing ball bearings, the system passes through one or more resonant frequencies as the system moves toward its operating speed. Consequently, damping of the system is required during startup and shutdown to avoid adverse effects on the system at resonant frequencies.

BRIEF SUMMARY OF THE INVENTION

In accordance with a preferred embodiment of the present invention, there is provided a damping system for the bearing of a rotating shaft wherein the damping action is provided by a brush having brush bristles disposed in an annular array about the bearing. As employed in a damping system hereof, the brush bristles are disposed between a fixed support and a centering spring (movable support) carrying the bearing about the shaft. It will be appreciated that the centering spring and fixed support do not rotate about the shaft axis. The movable support, however, moves radially and orbitally in response to radial excursions of the shaft, including vibration. The bristles absorb the radial and orbital displacements of the centering spring.

In a preferred form of the present invention, a pair of annular arrays of brush bristles are spaced axially one from the other defining a cavity therebetween. While the damping action is obtained through the interaction of the bristles and their engagement at their tips with the centering spring, which dissipates the vibrational energy of the shaft, the magnitude of the damping action can be controlled by pressurizing the cavity between the arrays of brush seals. By pressurizing the cavity, the bristles are displaced axially and increase their damping force on the centering spring. The bristles, in effect, extend along their axis such that the tips exert a substantial and elastic radially inward force on the centering spring and hence moderate pressures within the cavity.

In a preferred embodiment according to the present invention, there is provided a damper assembly comprising a shaft having an axis of rotation, a bearing about the shaft, a fixed component about the bearing, a non-rotatable, radially and orbitally movable support carrying the bearing and carried by the fixed component and a generally annular damping element interposed between the fixed component and the support, the element including a generally annular array of brush bristles extending in a generally radial plane from the fixed component with tips thereof in engagement with the support to diminish the amplitude of the shaft vibrations.

In a further preferred embodiment according to the present invention, there is provided in a damper assembly including a bearing about a rotatable shaft, a fixed component about the bearing, a non-rotatable radially and orbitally movable support carrying the bearing and carried by the fixed component, a method of damping shaft vibrations including the steps of disposing a damping element between the fixed component and the support having a generally annular array of bristles, and engaging tips of the bristles against the support to diminish the amplitude of shaft vibrations.

DETAILED DESCRIPTION OF THE INVENTION

Figure 1:
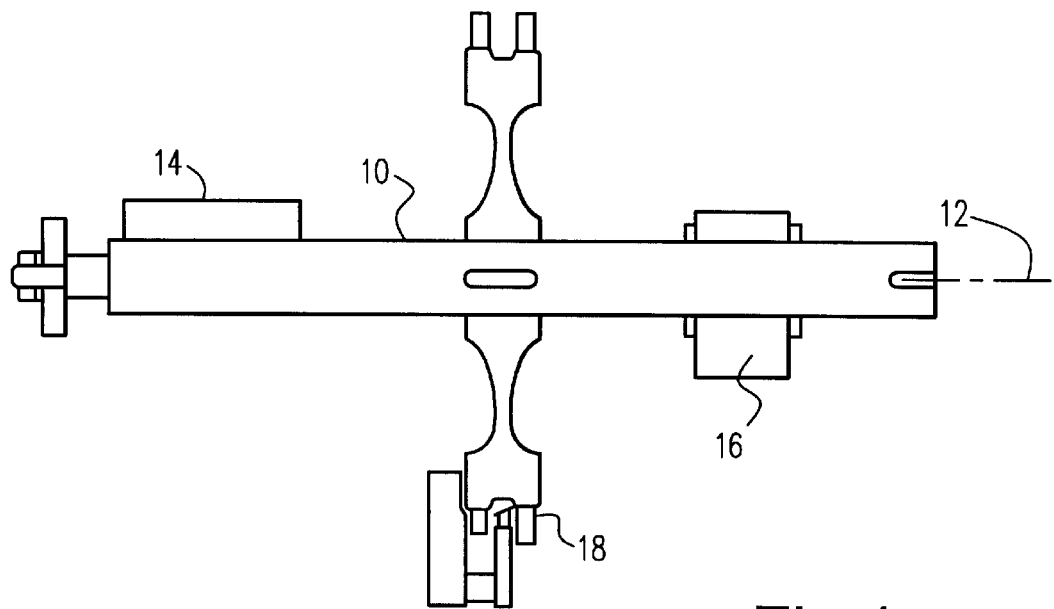
FIG. 1 is a schematic representation of a steam turbine rotor shaft with a pair of hydrodynamic bearings at opposite ends thereof.

Referring now to the drawings, particularly to FIG. 1, there is illustrated a shaft or rotor 10 rotatable about an axis 12 and mounted on a pair of bearings 14 and 16 adjacent opposite ends. Interposed between the bearings 14 and 16 is a series of turbine blades 18. It will be appreciated that the schematically illustrated rotor may comprise a rotor for a steam turbine.

Figure 2:
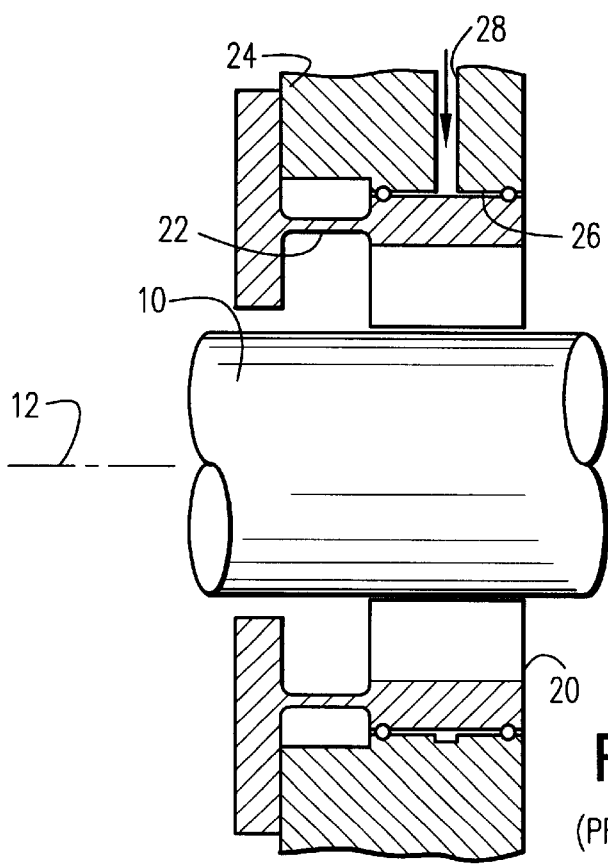
FIG. 2 is a fragmentary cross-sectional view of a prior art squeeze film damping system.

In FIG. 2, there is illustrated a prior art squeeze film bearing damper, e.g., forming a part of the bearings 14 and 16 of FIG. 1. For example, in FIG. 2, the rotor 10 is disposed in a bearing 20, which may comprise ball or roller bearings or tilt pad bearings. The bearing 20 in the case of roller or ball bearings has an outer race which is fixed to a centering spring 22, in turn fixed to a fixed support 24. The centering spring 22 is spaced from the fixed support 24 by an annular cavity 26. Oil is delivered under pressure into the cavity 26 via an oil delivery line 28. In this prior art arrangement, it will be appreciated that as the shaft 10 rotates, the vibrational action of the shaft is transmitted through the bearing 20 to the centering spring 22 in the form of radial and orbital movement of the centering spring. This non-rotational but radial and orbital movement of the centering spring cyclically compresses the oil in the cavity 26 to provide a damping action.

Figure 3:
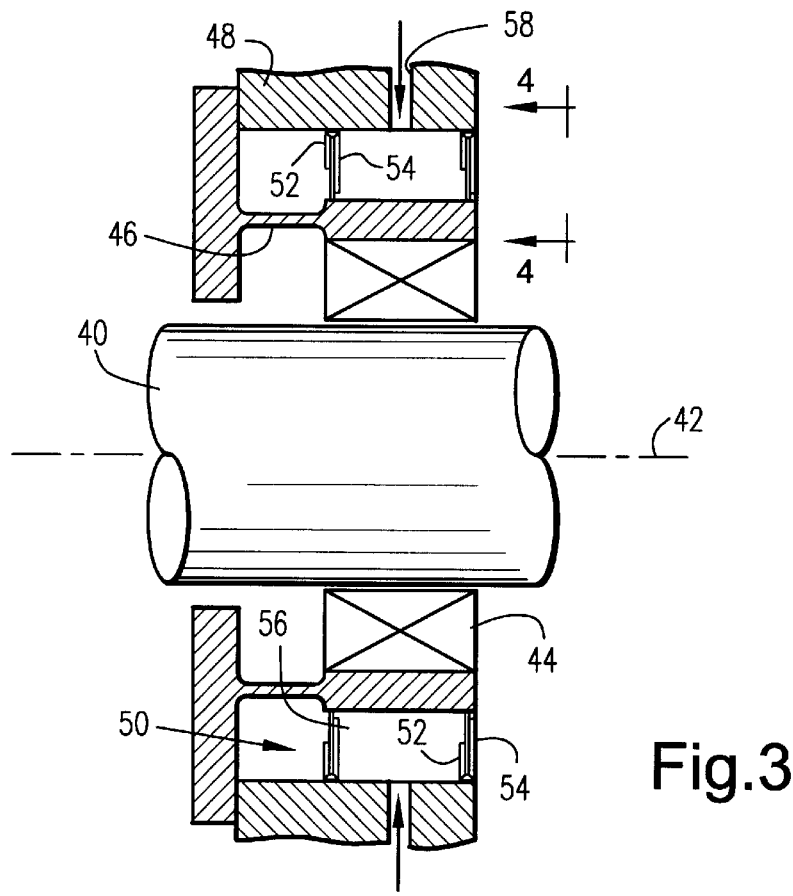
FIG. 3 is a view similar to FIG. 2 illustrating a damping system constructed in accordance with a preferred embodiment of the present invention.
Figure 4:
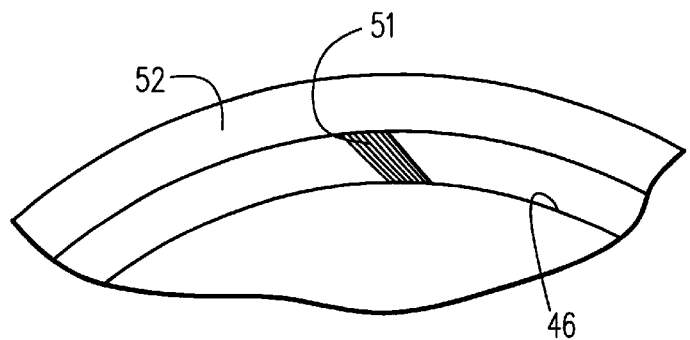
FIG. 4 is a cross-sectional view thereof taken generally about on line 4—4 in FIG. 3.

Referring now to FIG. 3, which is illustrative of a preferred embodiment of a damping system according to the present invention, there is provided a shaft, generally designated 40, rotatable about an axis 42 in a bearing 44. The bearing 44 may comprise any one of a number of different types of bearings, for example, ball or roller bearings or tilt pad bearings. It will be appreciated that at least an outer portion of the bearing is non-rotational about the axis 42. The bearing 44 is mounted on a support, e.g., a centering spring 46, which, in turn, is secured to a fixed component 48. As in the case of a squeeze film oil damper, the centering spring 46 does not rotate. Rather, the centering spring 46 moves radially and orbitally in response to vibrations and dynamic loadings on the shaft 40.

Figure 5:
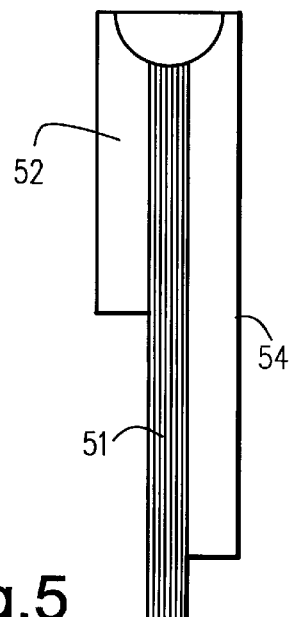
FIG. 5 is a fragmentary cross-sectional view of the annular array of brush bristles.

To damp those vibrations and loadings, i.e., diminish the amplitude of the shaft vibrations, one or more damping elements, generally designated 50 is provided. Each damping element 50 comprises an annular array of bristles 51 disposed between the fixed component 48 and the centering spring 46. The bristles 51 are supported by a pair of backing plates 52 and 54 on opposite sides of the bristles. The backing plates may be welded to one another and to the metal bristles at their radially outer ends. The radially inner ends of the bristles project beyond the inner edges of the backing plates 52 and 54, terminating in tips in engagement against the outer surface of the centering spring 46. The damping elements 50 are secured to the fixed component 48, for example, by welding. With reference to FIG. 5, it will be appreciated that the bristles 51 extend at a cant angle, for example, on the order of about 45° relative to the radius of the shaft.

In the illustrated form of the present invention, a pair of damping elements 50 are disposed between the fixed component 48 and centering spring 46 at axially spaced locations along the bearing defining a cavity 56 between the bristles 51 and the fixed component 48 and centering spring 46. As the vibrational and dynamic loading on the shaft 40 is transmitted through the bearing 44 to the centering spring 46, the centering spring 46 obtains a non-rotational radial and orbital movement. To dampen that movement, the bristles 51 maintain their engagement with the outer surface of the centering spring 46. The interaction of the bristles 51 and the engagement of their tips with the centering spring surface dissipates the vibratory and dynamic energy transmitted thereto by shaft 40. That is, the bristles change positions cyclically and those cyclic forces between the bristles and the shaft create a damping action.

There are a number of different advantages of employing this damping element to effect a damping action on a bearing in accordance with the present invention. One advantage is that the bristles do not wear to the extent that bristles in contact with a rotating part wear. That is, because the centering spring is displaced only radially and orbitally and does not rotate, the bristles do not wear as they extend and flex between the fixed support and a non-rotating orbitally moving centering spring. Additionally, the damping force can be selectively increased. For example, by pressurizing the cavity 56 between the damping element 50 via a conduit 58 with a pressurizing medium, for example, air or steam, the damping force on the centering spring 46 can be increased. Thus, by pressurizing the cavity 56, the tips of the bristles exert a greater radial inward force on the spring at moderate pressures as a result of a Poisson effect. Further, the pressurization of the cavity with steam in the case of a steam turbine is particularly economical due to the availability of the steam and the nominal leakage of steam from the cavity. It will be appreciated that the array of bristles forming damping elements 50 also serve as brush seals, limiting the leakage of the pressurizing medium in the cavity 56.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A damper assembly comprising:

a shaft having an axis of rotation;

a bearing about said shaft;

a fixed component about said bearing;

a non-rotatable, radially and orbitally movable support carrying said bearing and carried by said fixed component;

a generally annular damping element interposed between said fixed component and said support, said element including a generally annular array of brush bristles extending in a generally radial plane from said fixed component with tips thereof in engagement with said support to diminish the amplitude of the shaft vibrations;

a second annular damping element interposed between said fixed component and said support wherein said second element includes a generally annular array of brush bristles extending in a generally radial plane from said fixed component with tips thereof in engagement with said support to diminish the amplitude of shaft vibrations, the first-mentioned and second elements being axially spaced from one another; and said elements and said fixed component and said support defining a generally annular cavity about said support, and a conduit for supplying a pressurized medium into said cavity to increase the contact force between said bristle tips and said non-rotatable support.

2. A damper assembly according to claim 1 wherein said bristles extend at a cant angle relative to radii of said shaft.

3. A damper assembly according to claim 1 wherein said bristles serve as a brush seal for maintaining said space pressurized by the pressurized medium.

4. A damper assembly according to claim 1 wherein said damper elements include backing plates on opposite sides of said bristles.

5. A damper assembly according to claim 1 wherein said support includes a centering spring in engagement with the bristle tips to dissipate the vibratory energy transmitted thereto by the shaft.

6. In a damper assembly including a bearing about a rotatable shaft, a fixed component about the bearing, a non-rotatable radially and orbitally movable support carrying the bearing and carried by the fixed component, a method of damping shaft vibrations including the steps of:

disposing a damping element between the fixed component and the support having a generally annular array of bristles, and engaging tips of the bristles against the support to diminish the amplitude of shaft vibrations;

disposing a second damping element between the fixed component and the support having a generally annular array of bristles and engaging the tips of the bristles of said second damping element against the support to diminish the amplitude of shaft vibrations; and spacing the first mentioned and the second damping elements axially from one another to define a cavity therebetween, and pressurizing said cavity with a fluid medium to vary the damping force on the shaft.

7. A method according to claim 6 including extending the bristles from said support at a cant angle relative to radii of said shaft.

8. A method according to claim 6 including the bristles of each damping element at a cant angle relative to radii of said shaft.

* * * * *